(12) United States Patent
Suzuki et al.

(10) Patent No.: US 7,671,575 B1
(45) Date of Patent: Mar. 2, 2010

(54) TRANSIENT LOAD RESPONSE FOR A VOLTAGE REGULATOR WITH A LOAD CURRENT BASED CONTROL LOOP

(75) Inventors: Hidehiko Suzuki, Tokyo (JP); Kenji Tomiyoshi, Chiba (JP)

(73) Assignee: National Semiconductor Corporation, Santa Clara, CA (US)

( * ) Notice: Subject to any disclaimer, the term of this patent is extended or adjusted under 35 U.S.C. 154(b) by 189 days.

(21) Appl. No.: 11/557,479

(22) Filed: Nov. 7, 2006

(51) Int. Cl.
*G05F 1/40* (2006.01)
(52) U.S. Cl. ...................................... 323/285; 323/284
(58) Field of Classification Search ................ 323/282, 323/283, 284, 285, 290, 351
See application file for complete search history.

(56) References Cited

U.S. PATENT DOCUMENTS

| 5,373,243 | A * | 12/1994 | Van Roermund et al. | .... 324/605 |
| 6,518,738 | B1 * | 2/2003 | Wang | .......................... 323/284 |
| 7,026,800 | B2 * | 4/2006 | Liu et al. | .................... 323/270 |

OTHER PUBLICATIONS

Song, Chunping et al., "High-Accuracy Hysteretic Current-Mode Regulator for Powering Microprocessors", IEEE, 2006, pp. 506-509.

Peterchev, Angel V. et al., "Design of Ceramic-Capacitor VRM's with Estimated Load Current Feedforward", 2004 35th Annual IEEE Power Electronics Specialists Conference, pp. 4325-4332, Aachen, Germany, 2004.

* cited by examiner

*Primary Examiner*—Jessica Han
(74) *Attorney, Agent, or Firm*—Darby & Darby P.C.; Matthew M. Gaffney

(57) ABSTRACT

A circuit for improving transient response for a load coupled to a voltage regulator by employing both load current level information and the regulator's output voltage to control a loop that provides relatively faster and accurate regulation of the regulator's output voltage. The circuit includes an error amplifier that is coupled to a reference voltage and feedback resistors connected to the regulator's output voltage. This error amplifier outputs a compensation signal that is subsequently summed at a summing point with additional information regarding the amount of current flowing through the load. Then, this summed compensation signal is subsequently employed by a pulse width modulation (PWM) comparator and other components to regulate the regulator's output voltage with improved speed and accuracy. The circuit can be arranged in different topologies, including buck, boost, and buck/boost.

19 Claims, 7 Drawing Sheets

TRANSIENT LOAD RESPONSE FOR A VOLTAGE REGULATOR WITH A LOAD CURRENT BASED CONTROL LOOP

FIELD OF THE INVENTION

The invention is directed to voltage regulation, and more particularly to employing a feedback loop based on a load current to improve the transient response of a voltage regulator operating under a load.

BACKGROUND OF THE INVENTION

The output of a regulator circuit is preferably maintained at a relatively constant voltage even if a relatively large transient change in the load current occurs. One way to enable this relatively constant output voltage is to feed back the output voltage in a loop that controls the regulator's output voltage. However, the speed at which the regulator can respond to a load transient is mostly limited by how fast the feedback loop can react to a change in load.

Typically, a voltage regulator is employed in many applications that provide a relatively constant current, such as Light Emitting Diode (LED) applications. Also, LED applications often enable dimming of the emitted light by switching the relatively constant current "on" and "off" periodically, e.g., reducing the periodic pulse width of the "on" time versus the "off" time while at the same time maintaining the driving current for the LED during the on time at a relatively constant level. However, at least in part because of this relatively fast on/off switching, the application's voltage regulator often exhibits undershoot in its output voltage at the beginning of the "on" pulse and/or overshoot in its output voltage at the start of the "off" pulse. This overshoot and/or undershoot in the output voltage can cause audible noise that is undesirable for operating LEDs and other applications.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1A:
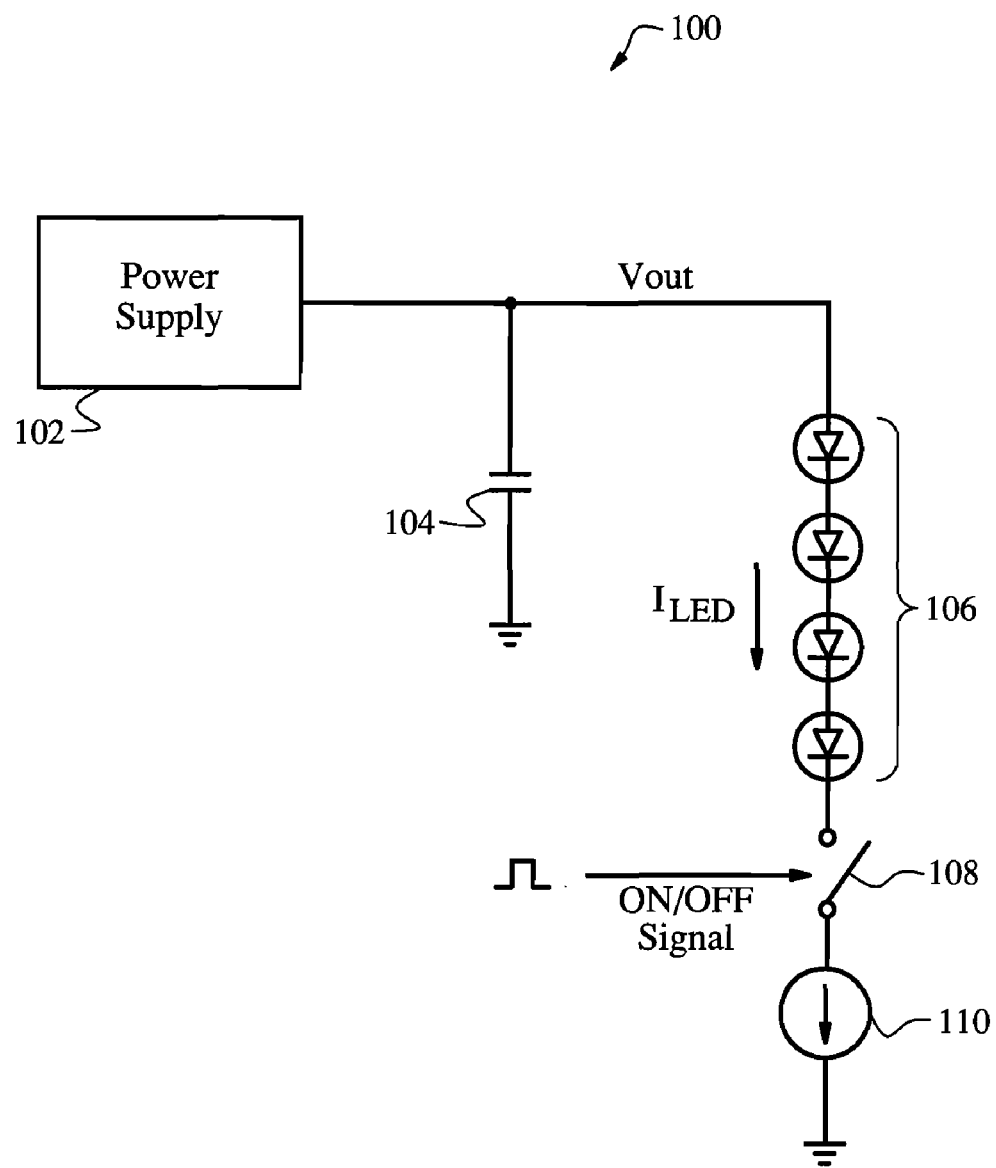
FIG. 1A shows a schematic diagram of a generalized circuit for powering serially coupled Light Emitting Diodes (LEDs) whose illumination is controlled by the switching of a constant current source.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated the present invention is directed toward improving transient response for a load coupled to a voltage regulator by employing both load current level information and the regulator's output voltage to control a loop that provides relatively faster regulation of the regulator's output voltage. A circuit is arranged to include an error amplifier that is coupled to a reference voltage and feedback resistors that are connected to the regulator's output voltage. The error amplifier outputs an error signal (at the node labeled EAout in FIG. 2C) that is summed at a summing point with information regarding the amount of current actually flowing through the load. This information is a representation of both the sensed (measured) load current and the expected (pre-programmed) load current. Then, this summed error signal (labeled EAout') is subsequently employed by a pulse width modulation (PWM) comparator and other components to regulate the regulator's output voltage with improved speed and accuracy.

In at least one embodiment, the relatively instantaneous information regarding the load current at the summing point is provided by a connection to a constant current source that sinks the current flowing through the load. This information can be provided in advance of, synchronous with, or following the change in load current.

Also, in at least one embodiment, the current source itself can be switched/controlled by an on/off signal that can be arranged to change its state on a periodic basis. In yet another embodiment, an external switch can be coupled to a constant current source and arranged to turn the current source's output current on (I current) or relatively off (zero, I/n). The switch can be embodied by one or more bipolar transistors, MOSFET transistors, analog switches, and the like.

Additionally, in at least one embodiment, the summed EAout' signal is received by a pulse width modulation (PWM) comparator that controls the operation of a latch, e.g., an S-R latch, which is further arranged to control/switch an inductor current that provides energy to the output. At least one resistor can be provided to monitor the inductor current as current feed back, which is known as current mode control topology.

FIG. 1A illustrates a general overview of circuit 100 that is arranged to provide regulated power for a load. Circuit 100 includes power supply 102 whose output is arranged to drive a load of Light Emitting Diodes (LEDs) 106. Capacitor 104 is coupled between earth and the output of supply 102 in part to enable some smoothing of the output voltage provided to LEDs 106. Also, supply 102 can be configured as a switching regulator. Constant current source 110 is tied between the load of LEDs and ground. Also, switch 108 is arranged to open and close a conductive path between LEDs 106 and current source 110. In operation, if switch 108 is closed, supply 102 provides power to the load (LEDs 106) with a relatively constant current sink that is enabled by constant current source 110.

Figure 1B:
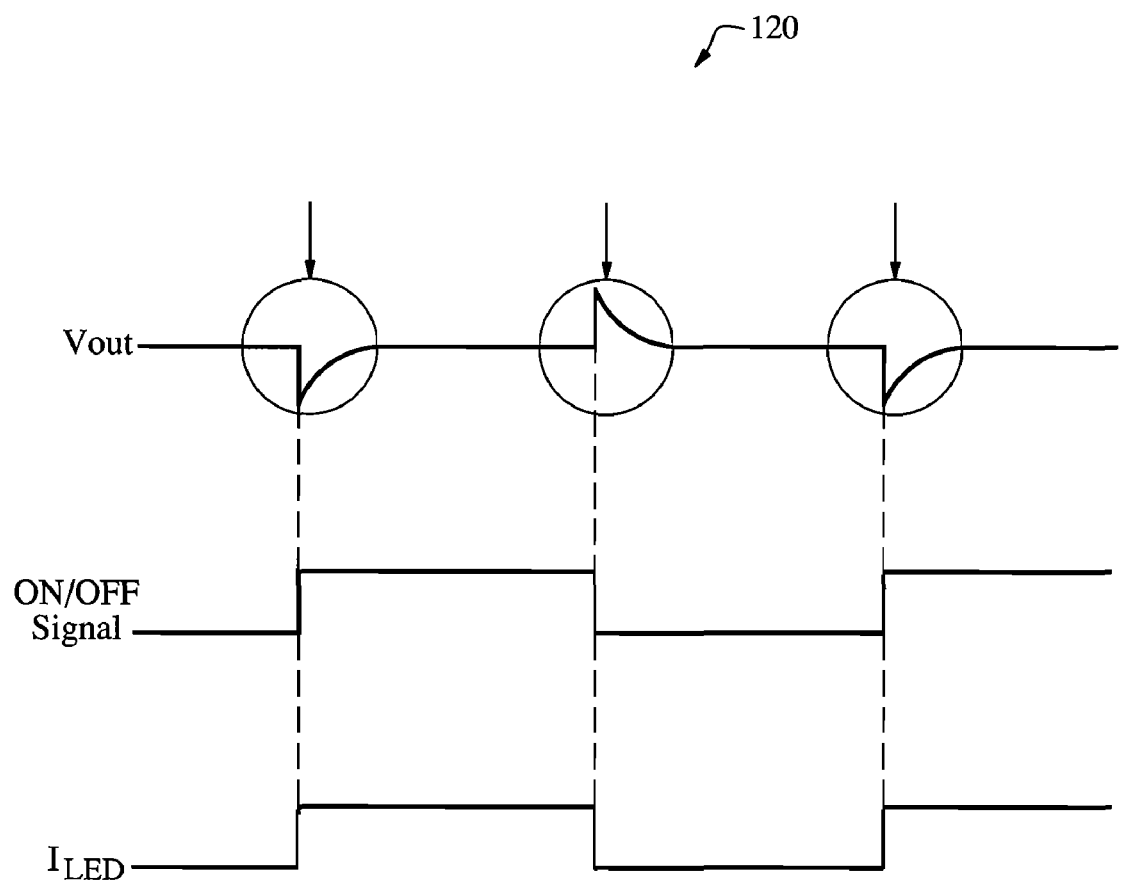
FIG. 1B illustrates a timing diagram illustrating the waveforms generated by the generalized circuit shown in FIG. 1A.

FIG. 1B illustrates graph 120 of the output voltage provided to the load (LEDs 106), the load current (ILED), and the states of an on/off signal that controls switch 108, as shown in FIG. 1A. As illustrated, output voltage undershoot and overshoot occurs when the states of the on/off signal transition. Also, this voltage step leads to audible noise from capacitor 104 at the output connected to the load.

Figure 2A:
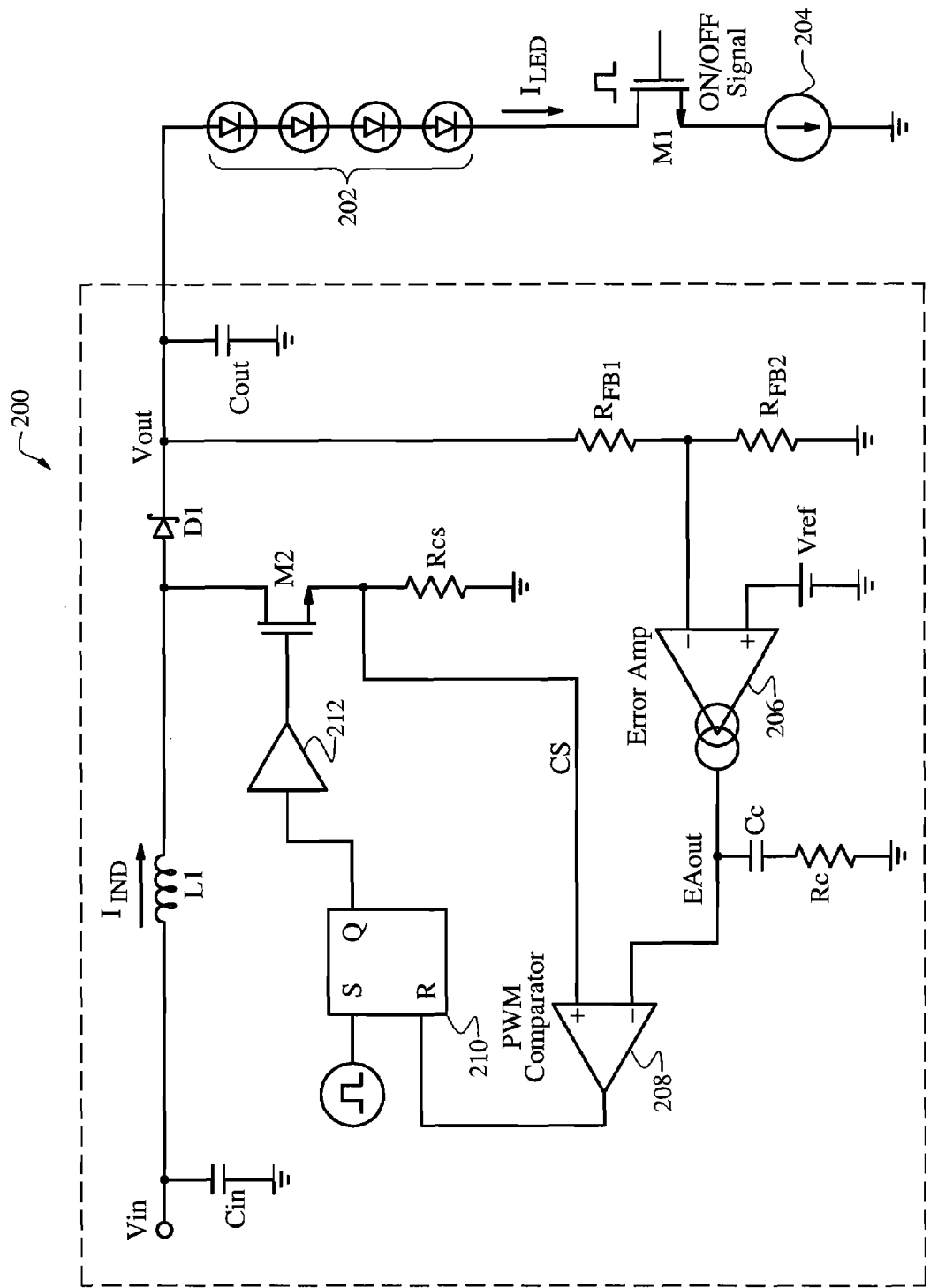
FIG. 2A shows a schematic diagram of one embodiment of a circuit for powering one or more LEDs whose illumination is controlled by the switching of a constant current source.

FIG. 2A illustrates voltage regulator 200 arranged in a boost configuration. However, in other embodiments, regulator 200 could be arranged similarly, albeit differently, in a buck, buck/boost, or any other configuration.

In the embodiment shown in FIG. 2A, one end of resistor Rfb1 is coupled to node Vout and its other end is coupled to the inverting input of error amplifier 206. Further, the non-inverting input of amplifier 206 is coupled to a constant voltage source. Also, one end of feedback resistor Rfb2 is coupled to ground and its other opposite end is coupled to the inverting input of amplifier 206. At the inverting input to error amplifier 206, a representation of the output voltage Vout provided to load 202 can be sensed across feedback resistors Rfb1 and Rfb2. Additionally, an end of capacitor Cc is coupled to the output of error amplifier 206 and the capacitor's other end is connected by resistor Rc to ground.

One end of inductive element L1 is coupled to an input voltage VIN and an input capacitor (Cin) and its other end is coupled to a drain terminal of MOSFET M2 and an anode of Diode D1. Also, Diode D1 is arranged to prevent current flow when it is reverse-biased. A source terminal of MOSFET M2 is coupled to a non-inverting input of pulse width modulation (PWM) comparator 208 and an end of resistor Rcs. The other end of resistor Rcs is coupled to ground and the output (EAout) of the error amplifier 206 is provided at the inverting input of PWM comparator 208. The output of PWM comparator 208 is provided at the reset terminal of Set-Reset (SR) latch component 210, and a clock signal is provided at the set terminal of the latch component. Also, the clock signal at the set terminal generally has a frequency higher than the frequency of the on/off signal employed to control the conduction of the transistor M1. The output (Q) terminal of latch 210 is coupled to an input of gate driver 212 which amplifies the latch's output to control conduction of MOSFET M2 at its gate terminal. Additionally, as described above, the on/off signal which is arranged to control the LED current, is independent from the clock signal at the set terminal of latch 210. To dim the light outputted by the LEDs, this on/off (dimming) signal can be arranged to change state on a periodic basis. In at least one embodiment, the Clock signal can be synchronized to the off/on LED signal or load step to enable a relatively instantaneous boost switcher reaction.

Additionally, a capacitor Cout is connected to a location where the output voltage Vout is coupled to an end of load 202. As shown, the load is arranged as a series circuit formed by LEDs. However, in other embodiments, multiple LEDS can be connected in any combination of serial, parallel and/or mesh configurations. The other end of load 202 is coupled to drain terminal of MOSFET M1, which has its conduction controlled by an on/off signal provided at its gate terminal. Further, the source terminal of MOSFET M1 is coupled to constant current source 204 that sinks the current flowing through the load.

When the on/off (dimming) signal to the gate terminal of MOSFET M1 changes to an off state, M1 stops conducting. Also, when the state of the on/off (dimming) signal to the gate terminal of MOSFET M1 changes to an on state, M1 starts conducting. In this case, capacitor Cout is discharged and Vout becomes lower because charge feeds into the load that is LED current (ILED). This condition persists until the control loop has had sufficient time to respond by increasing the inductor current.

When the clock signal goes high at the Set terminal of Latch 210, M2 turns on. While in this phase of operation, energy is stored into inductive element L1 through MOSFET M2 and resistor Rcs. The voltage drop across resistor Rcs can be employed by comparator 208 to "sense" the current flowing through M2. When the reset signal goes high at the reset terminal of Latch 210, MOSFET M2 turns off and stored inductor current IIND start to charge Cout to maintain Vout. Furthermore, the clock signal described in this paragraph is a separate, much higher frequency signal than the dimming signal mentioned in the previous paragraph.

For latch 210, the signal at the Reset terminal is dominant. Therefore, if the signal at the Reset terminal is high, which means Vout is high (or at least the feedback loop says so), when the clock signal at the S terminal goes high, the output of the Q terminal stays low and M2 doesn't turn on. Furthermore, as the on/off (dimming) signal periodically changes state, e.g., to dim the light emitted by LEDs, the operation listed above is repeated in substantially the same manner.

Unfortunately, the ability of error amplifier 206 to compensate for Vout overshoot or undershoot by way of outputting an EAout signal to the non-inverting input of comparator 208 can lag in part because of the loop compensation capacitor Cc. However, the arrangement of capacitor Cc helps to stabilize the control loop. Although this arrangement is required to ensure stability of the control loop, it reduces the ability of the loop to prevent an overshoot/undershoot condition. In the past, audible noise in the output voltage Vout caused by capacitor Cc has been tolerated in exchange for this relatively stable voltage regulation.

Figure 2B:
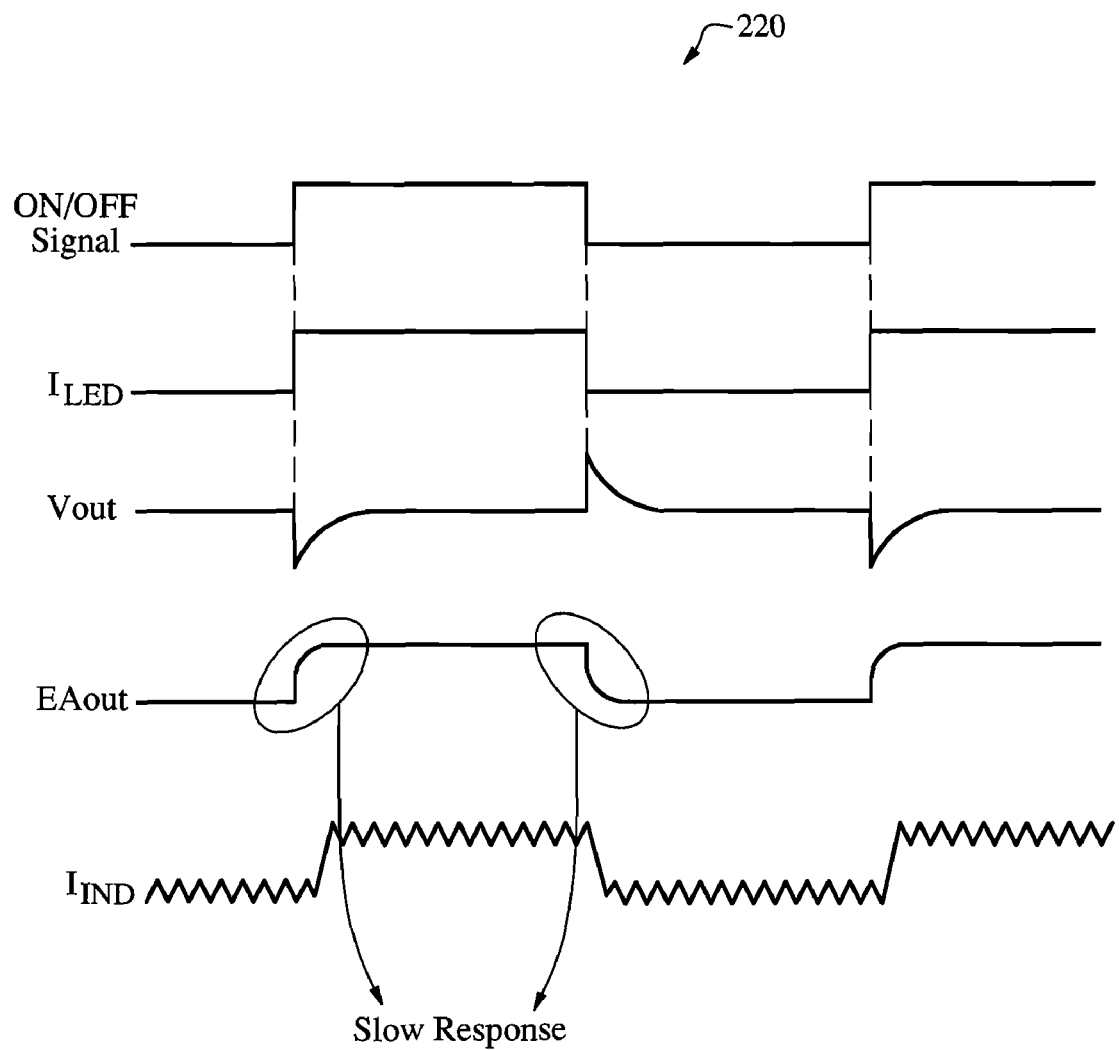
FIG. 2B illustrates a timing diagram showing the waveforms generated by the circuit shown in FIG. 2A.

FIG. 2B illustrates graph 220 of several signals, including output voltage Vout, the current at the load (ILED), the states of an on/off signal that controls the conduction of MOSFET M1, the EAout signal provided by the error amplifier to compensate the error at Vout, and an inductive current (IIND), which are generated in circuit 200 as shown in FIG. 2A. As illustrated, because of the relatively slow response of the control loop, relatively significant undershoot and overshoot in Vout occurs when the states of the on/off (dimming) signal transition.

Figure 2C:
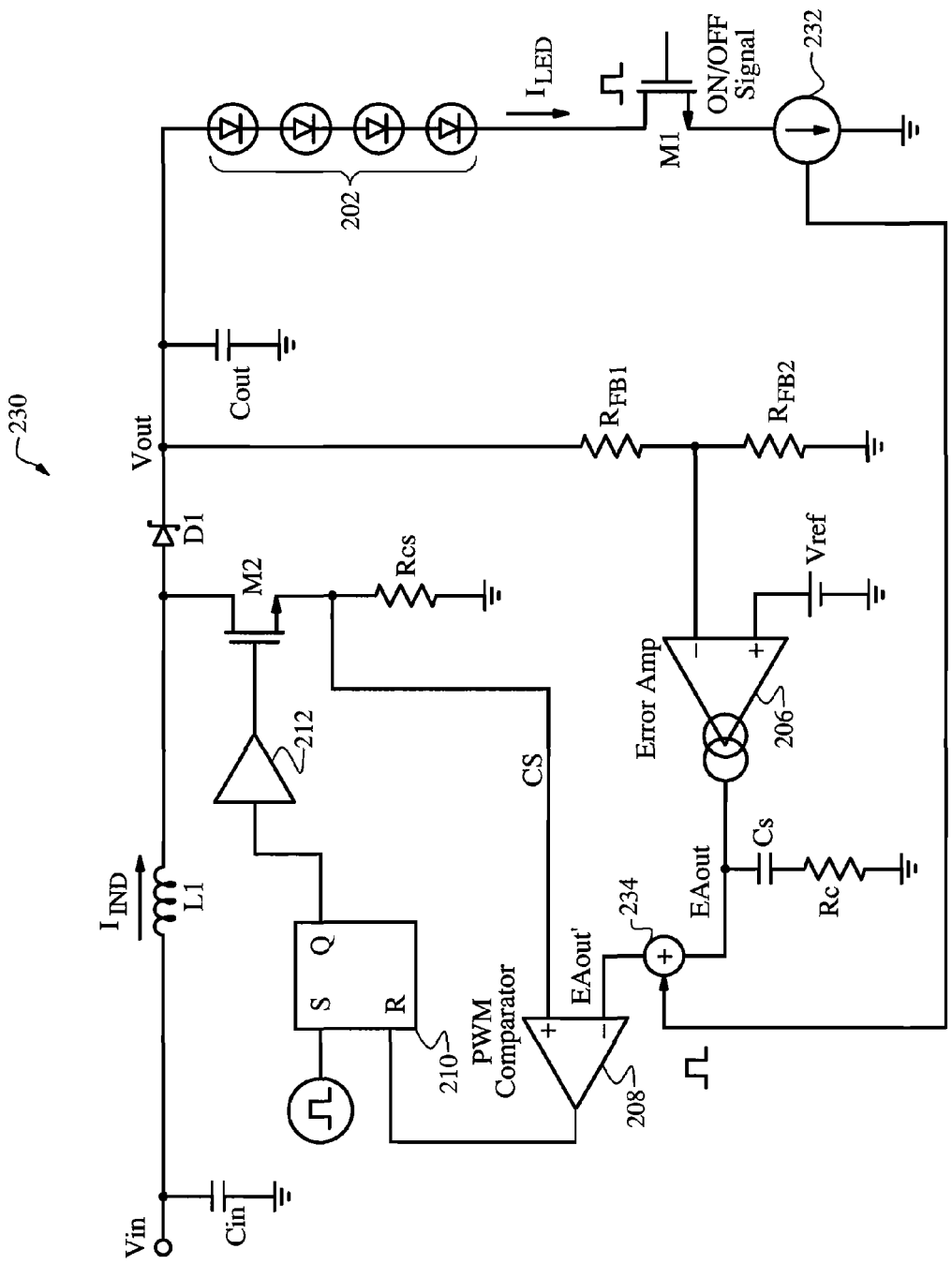
FIG. 2C shows a schematic diagram of another embodiment of a circuit for powering one or more LEDs whose illumination is controlled by the switching of a constant current source.

FIG. 2C illustrates novel voltage regulator 230 arranged in a boost configuration that operates in a manner substantially similar, albeit somewhat different to regulator 200 as shown in FIG. 2A. However, in other embodiments, regulator 230 could be arranged somewhat differently, e.g., in a buck, buck/boost, or any other configuration and still provide substantially the same benefit of an improved response to load transients.

In particular, constant current source 232 is arranged to sink the current flowing through load 202; but source 232 is also arranged to provide information regarding the amount of current flowing through the load to summing point 234. This current information can be provided in the form of a signal that is a representation of the amount of current that is currently flowing through the load. In at least one embodiment, summing point 234 can be arranged as a circuit that includes a summing amplifier. However, in other embodiments, other components, can be arranged to perform substantially the same function of summing the current information signal with the compensation EAout signal from the error amplifier.

Also, the load current information is summed with the error signal (EAout) outputted by error amplifier 206 at summing point 234 to produce a summed error signal (EAout'). The EAout' signal is provided at the inverting input of pulse width modulation (PWM) comparator 208. And, the output of PWM comparator 208 is provided at the reset terminal of Set-Reset (SR) latch component 210. A clock signal is also provided at the set terminal of the latch component. The output terminal of latch 210 is coupled to an input of gate driver 212 which is arranged to control the conduction/non-conduction of MOSFET M2 at its gate terminal. In operation, this summed error signal (EAout') enables the PWM comparator and the other related components to more closely control the regulator's output voltage in response to a load transient.

Figure 3:
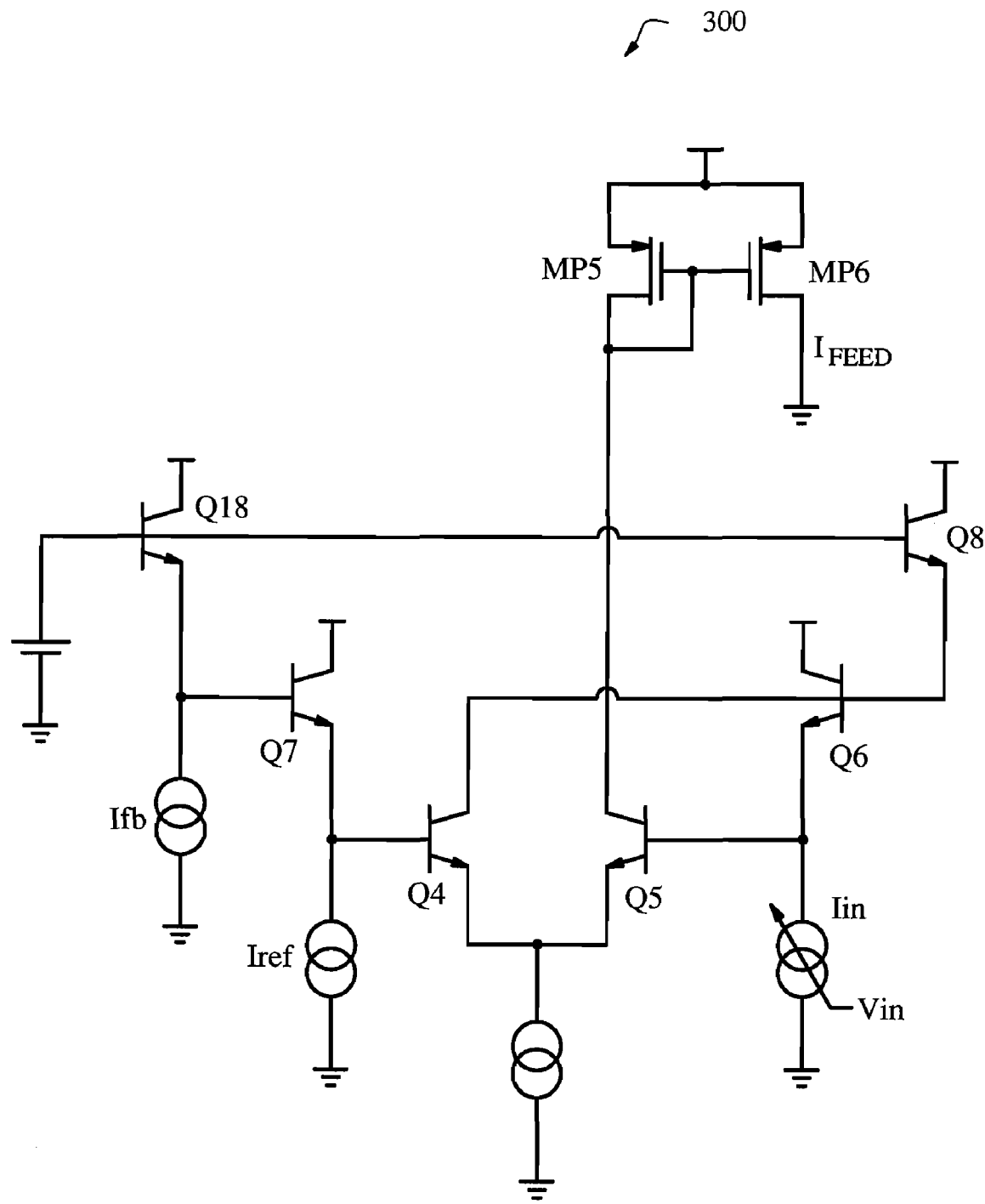
FIG. 3 shows a schematic diagram of an exemplary analog multiplier circuit that may be employed in the exemplary circuit illustrated in FIG. 2C, in accordance with the invention.

Furthermore, although also not shown, an analog multiplier circuit can be provided at summing point 234 for modifying the magnitude of load current information. An exemplary analog multiplier circuit is shown in FIG. 3 and discussed in greater detail below. Furthermore, MOSFET transistor M1 is arranged to periodically change back and forth between conduction and non-conduction of the load current (ILED) in response to an on/off signal coupled to the gate of transistor M1.

Figure 2D:
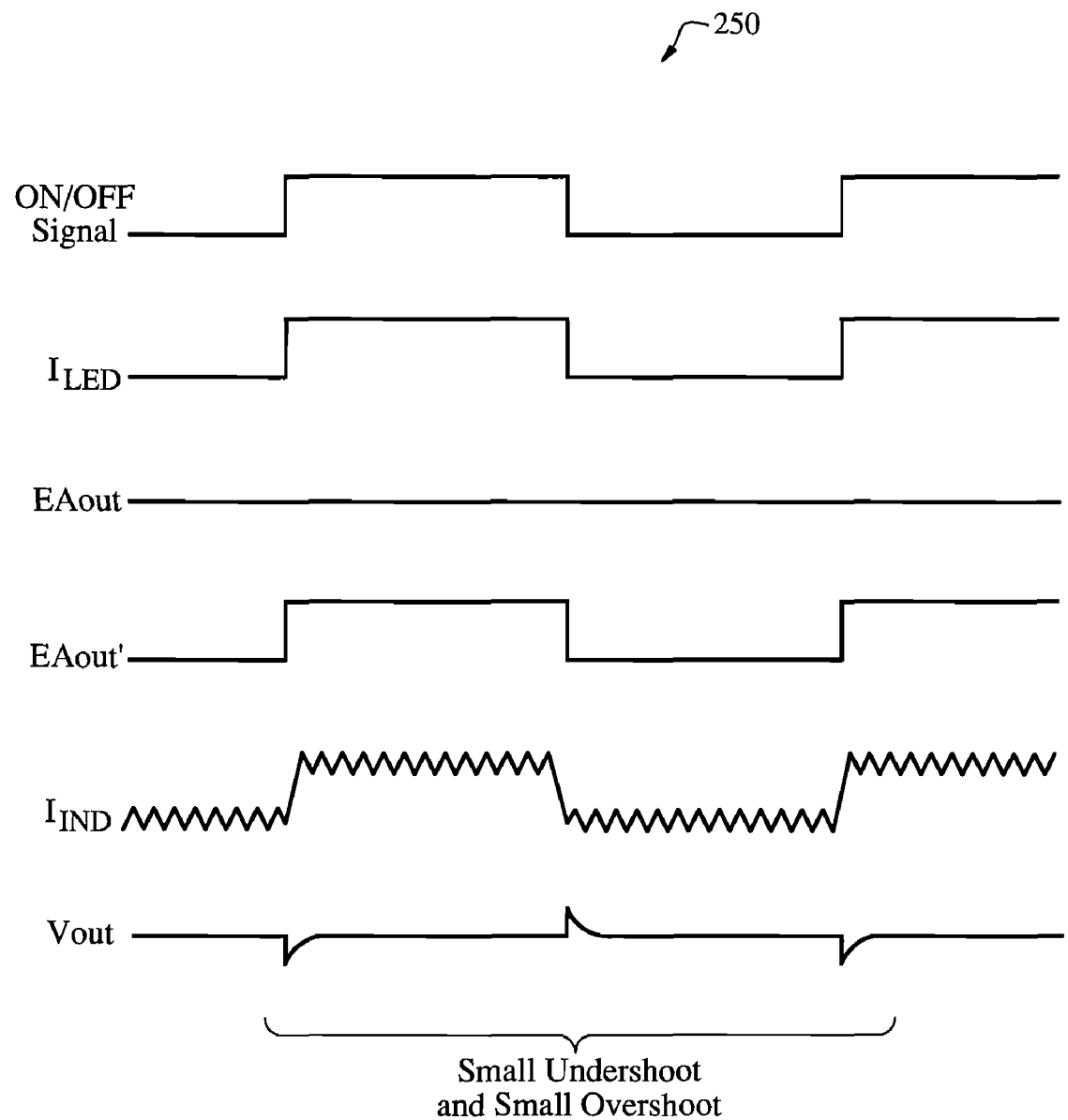
FIG. 2D illustrates a timing diagram showing the waveforms generated by the circuit shown in FIG. 2C.

FIG. 2D illustrates graph 250 of several signals, including output voltage Vout, the current at the load (ILED), the states of an on/off (dimming) signal that controls the conduction of MOSFET M1, the error (EAout) signal provided by the error amplifier, the summed error (EAout') signal provided by the summing point to the PWM comparator to compensate for overshoot and/or undershoot, and an inductor current (IIND), which are generated in circuit 230 as shown in FIG. 2C. As illustrated, relatively less undershoot and overshoot in Vout occurs when the states of the on/off (dimming) signal transition. The EAout' signal exhibits a step waveform because load current information is summed to EAout signal. As long as load information is appropriate, Vout can be held relatively constant by the feedforward signal. Therefore the EAout signal will be relatively constant too.

FIG. 3 illustrates a schematic diagram of analog multiplier 300, which employs a combination of bipolar junction transistors (Q4, Q5, Q6, Q7, Q8, and Q18), MOSFET transistors (Mp5 and Mp6), a voltage reference, and several current sources to modify the magnitude of the EAout' signal. The input current (Iin) can be adjusted in response to an input voltage (Vin). The feedback current (Ifb) enables external adjustment of the gain of the analog multiplier for Ifeed. In this circuit, the load current information can be modified to provide more accurate feed forward signal corresponding to external condition (VIN), in accordance with the regulator topology, e.g., boost, buck, and buck/boost topologies.

The invention can also be realized as a method of steps or process for providing improved load transient response. For example, after the circuit has been energized and regulation of the output voltage is occurring, the process determines an error signal based on the error/difference between a reference voltage and the output voltage provided to the load. Next, the error signal is summed with additional information regarding the amount of current actually flowing through the load at that time. Then, this summed error signal is subsequently employed in a pulse width modulation comparison with another signal that is representative of the amount of inductor current The resultant comparison signal is subsequently employed to enable regulation of the regulator's output voltage with improved speed and accuracy in response to a load transient. The process iteratively continues this method The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A circuit for regulating an output voltage provided to a load, comprising:
   an error amplifier for outputting an error signal based on a comparison of an error in a predetermined equivalence between a reference voltage and the output voltage provided to the load;
   a summing point for generating a summed error signal, wherein the summed error signal includes a summing of the error signal with an information signal regarding a current flowing through the load, wherein the summed error signal is a representation of both the error in the output voltage and an amount of current that is flowing through the load;
   a latch that enables the routing of a current to drive the load, wherein the operation of the latch is controlled by the summed error signal in response to both the amount of current that is flowing through the load and an error in the output voltage;
   a current source that is arranged to provide the information signal; and
   an analog multiplier, wherein the analog multiplier is arranged to modify the magnitude of the summed error signal.

2. The circuit of claim 1, further comprising two feedback resistors that are serially coupled between the output voltage and ground, wherein the output voltage is coupled through the feed back resistors to an input of the error amplifier.

3. The circuit of claim 1, further comprising a reset signal that is based on a pulse width modulation comparison between the summed error signal and another signal that is representative of the amount of inductor current that is directed to ground, wherein the reset signal is employed to control the operation of the latch.

4. The circuit of claim 1, wherein the regulation of the output voltage to the load further comprises a topology of the circuit in at least one of a buck, boost, or buck/boost.

5. The circuit of claim 1, wherein the current source is further arranged to provide the information signal in advance of, synchronous with, or following a change in the amount of current flowing through the load.

6. A circuit for regulating an output voltage provided to a load, comprising:
- an error amplifier for outputting an error signal based on a comparison of an error in a predetermined equivalence between a reference voltage and the output voltage provided to the load;
- a summing point for generating a summed error signal, wherein the summed error signal includes a summing of the error signal with an information signal regarding a current flowing through the load, wherein the summed error signal is a representation of both the error in the output voltage and an amount of current that is flowing through the load;
- a latch that enables the routing of a current to drive the load, wherein the operation of the latch is controlled by the summed error signal in response to both the amount of current that is flowing through the load and an error in the output voltage; and
- a current source that is arranged to provide the information signal, wherein the current source is coupled to the load, and wherein the current source is arranged to sink the current flowing through the load.

7. The circuit of claim 6, wherein the current source further comprises a component for providing the information signal to the summing point, and wherein the information signal includes at least one of information regarding a measured current that is flowing through the load and predetermined information regarding the current that is provided instantaneously, prior to, or during the measurement of the current.

8. A circuit for regulating an output voltage provided to a load, comprising:
- an error amplifier for outputting an error signal based on a comparison of an error in a predetermined equivalence between a reference voltage and the output voltage provided to the load;
- a summing point for generating a summed error signal, wherein the summed error signal includes a summing of the error signal with an information signal regarding a current flowing through the load, wherein the summed error signal is a representation of both the error in the output voltage and an amount of current that is flowing through the load;
- a latch that enables the routing of a current to drive the load, wherein the operation of the latch is controlled by the summed error signal in response to both the amount of current that is flowing through the load and an error in the output voltage,
- a current source that is arranged to provide the information signal; and
- a switch that provides a pathway for the current to ground in response to the routing of the current away from the load if the switch is closed by the operation of the latch.

9. A circuit for regulating an output voltage provided to a load, comprising:
- an error amplifier for outputting an error signal based on a comparison of an error in a predetermined equivalence between a reference voltage and the output voltage provided to the load;
- a summing point for generating a summed error signal, wherein the summed error signal includes a summing of the error signal with an information signal regarding a current flowing through the load, wherein the summed error signal is a representation of both the error in the output voltage and an amount of current that is flowing through the load;
- a latch that enables the routing of a current to drive the load, wherein the operation of the latch is controlled by the summed error signal in response to both the amount of current that is flowing through the load and an error in the output voltage;
- a current source that is arranged to provide the information signal; and
- a switch that provides a pathway for the current to flow from the load to ground independent of another switch that enables the routing of the current away from the load.

10. The circuit of claim 9, wherein the switch is arranged to periodically open and close to cause a reduced amount of average current to flow through the load, wherein the reduced average current is based on the constant peak current multiplied by a dimming duty cycle.

11. A voltage regulator that regulates an output voltage that is provided to a load, comprising:
- an error amplifier for outputting an error signal based on a comparison of an error determined between a reference voltage and the output voltage provided to the load;
- a summing point for generating a summed error signal, wherein the summed error signal includes a summing of the error signal with an information signal regarding a current that is instantaneously flowing through the load, wherein the summed error signal is a representation of both the error in the output voltage and an amount of current that is instantaneously flowing through the load;
- a latch that enables the routing of a current to drive the load, wherein the operation of the latch to route the current to the load is further controlled by the summed error signal in response to both the amount of current that is instantaneously flowing through the load and the error in the output voltage; and
- a current source that that is coupled to the load, wherein the current source is arranged to sink the current flowing through the load, and wherein the current source further comprises a component for providing the information signal to the summing point.

12. The voltage regulator of claim 11, further comprising an analog multiplier, wherein the analog multiplier is arranged to modify the magnitude of the summed error signal.

13. The voltage regulator of claim 11, further comprising a reset signal that is based on a pulse width modulation comparison between the summed error signal and another signal that is representative of the amount of inductive current that is directed to ground, wherein the reset signal is employed to control the operation of the latch.

14. The voltage regulator of claim 11, wherein the regulation of the output voltage to the load further comprises a topology of the voltage regulator in at least one of a buck, boost, or buck/boost.

15. The voltage regulator of claim 11, further comprising a switch that provides a pathway for the current to ground in response to the routing of the current away from the load if the switch is closed by the operation of the latch.

16. The voltage regulator of claim 11, further comprising a switch that provides a pathway for the current to flow from the load to ground independent of another switch that enables the routing of the current away from the load.

17. A method for regulating an output voltage provided to a load, comprising:
- determining an error signal based on an error between a reference voltage and the output voltage provided to the load;
- generating a summed error signal based on the summing of the error signal and an information signal that is a representation of an amount of a current that is flowing through the load;
- providing the information signal via feedforward; and
- employing the summed error signal to enable the routing of the current to drive the load in response to both the amount of the current that is flowing through the load and the error in the output voltage, wherein providing the information signal via feedforward includes sinking the current flowing through the load.

18. The method of claim 17, wherein enabling the routing further comprises employing a pulse width modulation comparison of the summed error signal with another signal that is representative of the amount of current that is directed to ground.

19. The method of claim 17, wherein the regulation of the output voltage to the load further comprises arranging a topology of at least one of a buck, boost, or buck/boost.

* * * * *

UNITED STATES PATENT AND TRADEMARK OFFICE
CERTIFICATE OF CORRECTION

PATENT NO. : 7,671,575 B1  Page 1 of 1
APPLICATION NO. : 11/557479
DATED : March 2, 2010
INVENTOR(S) : Hidehiko Suzuki et al.

It is certified that error appears in the above-identified patent and that said Letters Patent is hereby corrected as shown below:

In column 6, line 22, delete "method" and insert -- method. --, therefor.

In column 7, line 52, in claim 8, delete "voltage," and insert -- voltage; --, therefor.

In column 8, line 41, in claim 11, after "source" delete "that".

Signed and Sealed this

Nineteenth Day of October, 2010

David J. Kappos
*Director of the United States Patent and Trademark Office*